United States Patent [19]
Prutkin et al.

[11] Patent Number: 5,998,007
[45] Date of Patent: Dec. 7, 1999

[54] MULTIDIRECTIONALLY STRETCH-CRAZED MICROENCAPSULATED POLYMER FILM AND A METHOD OF MANUFACTURING THEREOF

[76] Inventors: Vladimir Prutkin, 477 34th Ave. #12, San Francisco, Calif. 94121; Oskar Kalman, 965 E. San Carlos Ave., San Carlos, Calif. 94070

[21] Appl. No.: 08/759,011

[22] Filed: Dec. 2, 1996

Related U.S. Application Data

[63] Continuation-in-part of application No. 08/573,954, Dec. 19, 1995, abandoned.

[51] Int. Cl.$^6$ ........................................ B32B 3/26
[52] U.S. Cl. .................. 428/320.2; 428/155; 428/321.1; 428/321.3; 428/321.5; 428/322.2; 428/323; 428/402.2; 428/402.21; 428/402.22; 428/402.24; 428/910; 264/210.6; 264/288.4; 264/288.8; 264/289.6; 264/343; 264/204; 264/210.7
[58] Field of Search ................... 428/155, 320.2, 428/321.1, 321.3, 321.5, 322.2, 323, 402.2, 402.21, 402.22, 402.24, 910; 264/210.6, 288.4, 288.8, 289.6, 343, 204, 210.7

[56] References Cited

U.S. PATENT DOCUMENTS

| | | | |
|---|---|---|---|
| 3,839,516 | 10/1974 | Williams et al. | 264/41 |
| 4,496,620 | 1/1985 | Park et al. | 428/323 |
| 4,595,707 | 6/1986 | McCreedy et al. | 521/62 |
| 4,678,684 | 7/1987 | Sand | 427/213.36 |
| 5,114,773 | 5/1992 | Bogdany | 428/95 |

FOREIGN PATENT DOCUMENTS

| | | |
|---|---|---|
| 780574 | 7/1980 | U.S.S.R. . |

*Primary Examiner*—William P. Watkins, III
*Attorney, Agent, or Firm*—Ilya Zborovsky

[57] ABSTRACT

A multidirectionally stretch-crazed microencapsulated polymer film having a matrix material and microcapsules which are formed in the matrix material in the form of crazes which are filled with an encapsulated substance (30, 30$a$) and oriented at least in two mutually intersecting directions X and Y. The filled crazes form a net-like structure. The microencapsulated film is produced by stretching the original film under a controlled rate of stretching in two intersecting directions in an environment of a surface-active substance with or, if necessary, without a material to be encapsulated. When stretching is discontinued, the crazes are closed and encapsulate the material.

8 Claims, 5 Drawing Sheets

MULTIDIRECTIONALLY STRETCH-CRAZED MICROENCAPSULATED POLYMER FILM AND A METHOD OF MANUFACTURING THEREOF

RELATED APPLICATION

This application is a continuation-in-part of application Ser. No. 08/573,954, filed on Dec. 19, 1995 ABN.

BACKGROUND OF THE INVENTION

1. Field of the Invention

The present invention relates generally to polymer films. More particularly, the invention relates to polymer films microencapsulated by means of a multidirectionally stretch-crazing process and to a method of manufacturing such films.

2. Description of Related Art

For better understanding of the present invention, it would be expedient to define some terms used in the present patent application.

Encapsulation is a technological process in which small amounts of substances known as cores are enclosed within another material known as a matrix material. The types of substances that may be encapsulated include solids, liquids, gases, as well as mixtures, suspensions, emulsions, and solutions of the above.

When the core of an encapsulated substance is around 300 $\mu$m or smaller, such encapsulation is referred to as microencapsulation. Our invention applies to microencapsulation of substances with crazes having in an opened state a width from from 50 Å to 100 $\mu$m in width and many times of that in length.

Encapsulating walls of microcapsules may have a thickness from a fraction of a micron to tens of microns. The walls can be either rigid or elastic and comprise one or more layers. These encapsulating walls are usually made from high molecular compositions of animal or plant origin, such as proteins and synthetic polymers, and also from paraffin and stearin.

A great many microencapsulation techniques are known. Among them, the most common techniques are described in Encyclopedia of Chemical Technology, Vol. 13, 2nd Ed., N.Y., 1967, p. 436. All these techniques are based on processes of film formation in heterogeneous systems on interfaces between liquid and liquid, liquid and solid, gas and liquid, and/or gas and solid.

In terms of the film-formation principle, all known methods of microencapsulation can be roughly divided into the following three groups.

1) Formation of films from film-forming solutions with controlled rate of film formation. The mechanism of this technique is based on the use of solutions of a film-forming substance in an organic solvent or water. The microencapsulation is accomplished by isolating a phase enriched with the film-forming substance from multiple-component systems that constitute a dispersion of the substance to be encapsulated in a predetermined solution. This can be achieved by varying the temperature of the solution, its pH, or by evaporating a portion of the solvent. As a result, microscopic drops of the phase enriched with the film-forming substance are deposited on the surface of the material to be encapsulated thus forming a core covered with a continuous shell of the coating material.

Parameters of the aforementioned process are selected based on known phase diagrams of the multiple-component systems. Microencapsulation by that method, e.g., in a fluidized-bed layer, is used mainly for encapsulation of pharmaceutical substances where the duration of the process in some cases takes 5 to 20 hours. Another disadvantage of microencapsulation from a solution is that this process requires many technological steps, i.e., preparation of solution, 4 application of the solution, evaporation, hardening, and other steps, each requiring strict control of the operation conditions.

Other limiting requirements of the above process are non-solubility of the core material in the coating material and vice verse, a greater surface tension on the core than in the phase enriched with the film-forming material, and a lower surface tension than on interface of these phases, etc.

Other disadvantages of the encapsulation from the solution are low stability of the properties of the coating material in time, low storage stability, etc.

2) Film formation from a melt. This process is based on encapsulation of drops of a liquid core material. One example of this process is passing drops of a core material with a high speed through a liquid of a coating material, so that when the drop has passed through the liquid coating material, a portion of the latter remains on the surface of the drop and solidifies forming a shell. The aforementioned method is used for encapsulation by saturated solutions of salts, water, and glycerin with various thermoplastic materials. A disadvantage of the capsules produced by the above method is a risk of migration of low-molecular-weight substances from the coating layer to the core.

3) A third well-known method of microencapsulation is formation of a core-coating film as a result of polycondensation or polymerization.

To perform polycondensation on the interface between the core and coating, one of monomers is dissolved in an organic solvent and another in water that contains a small amount of a catalyst. A core material is introduced into one of the phases. In this process, the organic phase should neither dissolve the polymer formed in the process nor mix with water. With the introduction of one of the phases into another, e.g., through a dispersing nozzle, polycondensation immediately begins on the surfaces of particles that contain the core material. This process is accompanied by separation of microcapsules which float up or falls down, depending on their specific gravity.

When it is necessary to obtain microcapsules with dimensions from fractions of micron to several microns, polymerization is performed on the interface with a gaseous phase. Methods used for the preparation of aerosols may be utilized for encapsulation of the core material in an inert gas environment by combining the inert gas with vapors of a monomer capable of catalytic polymerization. [See U.S. Pat. No. 4,604,444 issued in 1986 to Donnadieu.]

Microencapsulation on the basis of polycondensation and polymerization to a great extent depends on the temperature of the process. Another serious disadvantages of this process is a risk of incomplete polymerization or polycondensation of the monomers. Since in many cases such monomers are toxic, their penetration into the core material may lead to undesired consequences.

All three methods described above relate to cases where a target core material is coated with a continuous capsule material, i.e., the coating has to be formed on the surface of material to be encapsulated. Such a coating process itself is highly substance-dependent: small variations in the material of the core and/or the material of the coating substance may require considerable alternations of the technological parameters, or even switching to another process of coating altogether. The aforementioned known processes are expensive as they require the use of complicated equipment, are difficult to control, and require a skilled labor. Furthermore, many of the procedures used to microencapsulate substances, such as drugs, do not adapt well to a large-scale commercial process either from mechanical or economical point of view. In other words, the disadvantages described above result from the nature of the technological processes used for encapsulation and therefore are unavoidable.

Attempts have been made to eliminate the disadvantages inherent in methods of encapsulation by coating the core material with a continuous capsule, in other words, to incorporate the material to be encapsulated into another ready-made matrix material with preselected properties.

For example, USSR Inventor's Certificate Application No. 2774421 filed on Jan. 6, 1979 by one of the authors of the present patent application describes a method of manufacturing long-lasting decorative films for the building industry by encapsulating a dye into a polymer film. This method is based on a uniaxial stretching of a film immersed into a coloring medium, whereby discrete cracks or crazes are formed and filled with the coloring medium. When stretching is discontinued, the crazes are closed leaving some of the coloring material encapsulated inside the film.

Crazes are minute cracks which are formed in the surface of a material such as polymer due to different properties on the surface and inside the material.

A disadvantage of this method consists in that the amount of encapsulated material is limited so that this method leaves most of the cavity-creating potential untapped. Therefore this method did not find practical application, even for decoration purposes.

It can be concluded that all of the currently applied methods of microencapsulation have the following three shortcomings inherent in the their technology. First, they are highly substance-specific. A slight change in surface properties, solubility, or some other characteristic of the encapsulated substance or encapsulating material, may cause the failure of the process. Second, the encapsulating is accompanied by chemical reactions, or a sudden change in temperatures or pressure. There is always potential for forming unwanted byproducts. Third, many of these processes are not suitable for mass production. The method described in the above mentioned Inventor's Certificate, although it does not have the shortcomings of the currently applied microencapsulation methods, is too ineffective to become a viable commercial technology even in its narrowly stated purpose, i.e., making decorative films.

Along with the microencapsulated products described above in the form of separate capsules consisting of a core covered with a coating, there is another group of microencapsulated products in the form of sheets or films that contain microcapsules.

For example, such films may be used as self-adhesive films that contain microcapsules with an adhesive substance applied onto the surface of the film. When a pressure is applied to the film, the capsules break, and the adhesive substance is released. [See Chem. Eng. Progress, 62, nO. 4, 87, 1966].

The manufacturing of such a product involves, apart from the production of the film, two more labor-consuming and expensive steps, i.e., microencapsulation and attachment of microcapsules to the film. Furthermore, the microencapsulation used in these processes have all the shortcomings inherent in conventional microencapsulation processes described earlier. Another problem of the method of manufacturing microencapsulated adhesive films consists in that the microcapsules have to uniformly distributed over the surface of the film.

Another example of a sheet-like microencapsulated product is a pressure-sensitive copying paper that contains microcapsules of a liquid pigment attached to one side of the paper. When a pressure is applied to the other side of the paper which is placed onto copy paper, the microcapsules which experience pressure are broken, the pigment is released, and transferred to copy paper. The pressure-sensitive copying paper possesses the same disadvantages as those inherent in the microencapsulated self-adhesive films.

Other examples of microencapsulated sheets and films are photosensitive paper (sensitive to UV rays) and a magnetic recording tape. Such products also require two additional steps, apart from the manufacturing of the film, i.e., the preparation of microcapsules and their attachment to the substrate. It is essential to note with regard to these specific products that their main characteristics such as resolution capacity and quality of the image depend exclusively on the uniformity and density of distribution of the microcapsules. These requirements further contributes to complexity and cost of manufacturing of such products.

A good example of products that contain films coated with microcapsules are dry cells used as a source of electric power. An essential part of such a cell is a polymer fiim coated on one side with silver peroxide (used as a negative electrode) and zinc on the other side of the film (as a positive electrode). In addition, the surface of the film is coated with capsules containing a KOH solution. The films are stored in rolls and are in contact with pressure rolls and current-collecting rolls. When it is necessary to activate the cell and to induce a voltage on the cell's terminals, the film is squeezed between the pressure rolls, the alkaline solution is released from the capsules, and an electrochemical reaction that occurs between the materials of both electrodes in the alkaline solution generates electric energy. [See previous reference.]

Microencapsulated films find various applications in medicine and pharmacology. For example, films are produced with microcapsules containing liquid crystals of certain fatty acid ethers and cholesterol which change their color under the effect of temperature. Such films are used as thermometers by applying the color-temperature-sensitive film on the surface of the patient's body.

Thus is can be concluded that all known film or sheet-like microencapsulated products are expensive to manufacture, involve many technological manufacturing steps, require strict control of the distribution and density of the microcapsules, and complicated and expensive method of controlling the amounts of substances to be microencapsulated. Furthermore, micro encapsulation of the films or sheet-like materials by applying microcapsules onto their surface impairs mechanical and physical characteristics of the initial film.

SUMMARY OF THE INVENTION

It is an object of the invention to provide multidirectionally stretch-crazed microencapsulated polymer films which are inexpensive to manufacture, contain microcapsules inside the material of the film, contain microcapsules that form a closed net-like structure inside the film material, involve only a few technological manufacturing steps, can be produced with a simplified control of the distribution and density of the microcapsules, may contain microcapsules as small as several tens of Angstrems, may contain in capsules a wide range of solid, liquid, and gaseous substances or their mixtures, is free of by-products of chemical reactions inherent in the conventional methods of encapsulation, and can be used with higher efficiency of encapsulation.

Another object of the invention is to provide a method for manufacturing the aforementioned microencapsulated films which is simple and inexpensive, not substance dependent, performed without any losses of the substance to be encapsulated, produced without a step of preliminary manufacturing of capsules, without a step of attaching the capsules to the surface of the film and thus is free of all disadvantages inherent in the steps of conventional encapsulation, could be performed at room temperature, is free of chemical reactions normally required for conventional encapsulation, and can utilize the cavity-formation potential of the film to a greater extent.

Further object of the invention is to provide a film strengthened by microencapsulation.

Accordingly, a multidirectionally stretch-crazed microencapsulated polymer film is provided having a matrix material and microcapsules which are formed in the aforementioned matrix material in the form of crazes which are filled with an encapsulated substance and oriented at least in the mutually intersecting directions. The filled crazes form a net-like structure.

Also, to a method of manufacturing the aforementioned film by placing the film is provided, including into an environment of a surface-active substance, stretching the film in the aforementioned environment in at least two mutually-intersecting directions with a controlled rate of stretching to form and open crazes in the surface of the film, filling the opened crazes at least with the surface-active substance alone or with another material to be encapsulated, releasing the film from stretching for closing the filled crazes due to relaxation of the film, and encapsulating the material entrapped within the closed crazes.

These and other objects and advantages of the present invention will be more apparent from the ensuing description of the invention with reference to the accompanying drawings.

DESCRIPTION OF PREFERRED EMBODIMENTS

Figure 1:
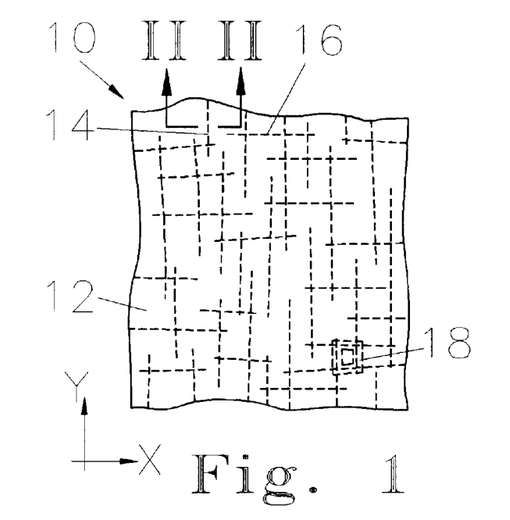
FIG. 1 is a schematic top view of a multidirectionally stretch-crazed microencapsulated polymer film of the invention with dozed crazes.

A multidirectionally stretch-crazed microencapsulated polymer film of the present invention which in general is designated as 10 is shown in FIG. 1 which is a top view of the film.

As shown in the drawing, a stretched-crazed microencapsulated polymer film 10 consists of a polymer film material 12 that has closed crazes which are filled with a liquid, solid, or a gaseous substance, or a mixture of them. As can be seen from this drawing, there are two groups of crazed microcapsules, i.e., crazed capsules 14 oriented in one direction, e.g., direction Y, and crazed capsules 16 oriented in another direction, e.g., direction X perpendicular to direction Y. At least part of crazed capsules 14 and 16 intersect and form a net-like structure with closed cells 18.

Figure 2:
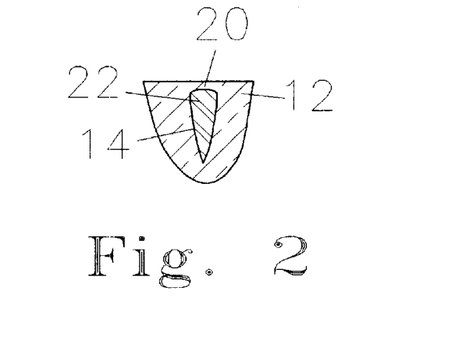
FIG. 2 is an imaginary model cross-sectional view along line II—II of FIG. 1 of a microcapsule formed by a closed craze filled in the encapsulated material.

An imaginary model of closed crazed capsule 14 is shown in FIG. 2 which is a sectional view along line II—II of FIG. 1. The sectional view of crazed capsule 16 in the direction perpendicular to the orientation of this capsule will be similar to the one shown in FIG. 2. The capsule shown in FIG. 2 is closed from the surface by a partition 20.

FIG. 2 shows a single closed capsule 14 filled with an encapsulated material 22. It is understood that in reality film 10 will have a plurality of similar capsules with part of them intersecting and communicating with each other. It is also understood that such capsules may be formed under one or both surfaces of the film.

The total weight of a material crazed-encapsulated within crazes in the material of the film may be up 40% of the film's initial weight.

Polymer compositions that are suitable for crazing include polystyrene, polycarbonate, polyethylene terephthalate, nylon, poly p-methylstyrene, poly t-butyl styrene, poly-2-methylpropene, flexible polyvinyl chloride, polymethylmetacrylate, styrene acrylonitrile copolymers, styrene butadiene copolymers, styrene butadiene copolymers (ABC resin), polyvinylpyrrolidone, styrene acrylic acid copolymers, styrene isoprene block copolymers, styrene butadiene block copolymers, polysulfones, polyester sulfones, blends of polystyrene and poly 2,6-dimethylphenylene oxide, and others.

Figure 3A:
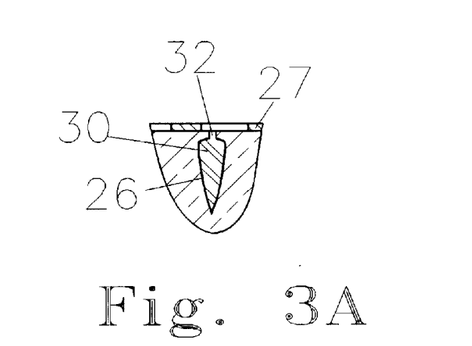
FIG. 3A is a view similar to that of FIG. 2 illustrating a partially opened microcapsule complete closing of which is restricted by means of a restriting layer attached to the film.
Figure 4:
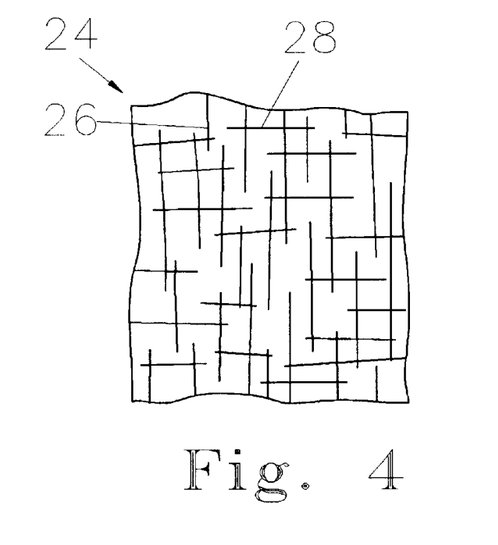
FIG. 4 is a top view of a film with crazes if the type shown in FIG. 3A.

If necessary, the capsules can be partially open to the surface of the film as shown in FIG. 3. In this case, a polymer film 24 will have a top-view appearance shown in FIG. 4 as in FIG. 1 with mutually intersecting crazed capsules 26 and 28 that contain encapsulated material 30 partially exposed to the surface of film 24 via a constricted passage 32. For maintaining capsules 26 and 28 in a partially open state, the surface of the film has to be coated with a relaxation-restricting means 27, e.g., in the form of a net-like structure attachable to the film and having a module of elasticity higher than that of the film.

Figure 3B:
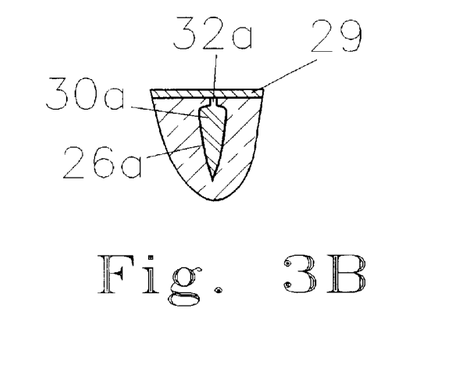
FIG. 3B is a view similar to that of FIG. 3A wherein the partially closed and filled microcapsules are temparily covered with a peelable adhesive tape.

Another embodiment of the microencapsulated film with temporarily closed capsules 26a is shown in FIG. 3b. In this case, encapsulated material 30a and passages 32a to the surface of the film are closed with a peelable film 29 such as a film known under trademark Scotch. When it is necessary to open the capsules, tape 29 may be peeled off the film. Although tape 29 is shown on one side of the film, it is understood that it may be on both side of the film or at least on a portion of the film surface where it is necessary to temporarily close the capsules.

Completely enclosed capsules 14 may be used, e.g., for release of material 22 by diffusion through partition 20, whereas partially opened capsules, e.g., capsule 26, may be used for releasing material 30 in a capillary manner via passage 32.

Stretch-crazing is performed in the environment of a surface-activation substance. That substance can be either in a liquid or gaseous state. The surface-active substance is necessary to reduce the surface energy of the film to facilitate opening of new surfaces formed in the course of stretching. Furthermore, the surface-active substance functions as a carrier for the material to be encapsulated which can be dissolved or suspended in the surface-active substances. The surface-active substance may remain in the capsule together with the encapsulated material, or it can be removed, e.g., by evaporation prior to closing of the capsules. The surface-active substance itself can be an object of encapsulation.

The following are examples of surface-active substances suitable for the invention: isopropyl alcohol, amyl alcohol, ethanol, isoamyl alcohol, ethyl alcohol, chloroform, etc.

The following are examples of substances that may be encapsulated: photostabilzers, thermal stabilizers, antioxidants, fire-proofing compounds, antiseptics, alcohols, iodine, gasoline, therapeutical and pharmaceutical substances, pigments, carbon black, liquid metals such as mercury, solid metals such as indium.

Now a method for manufacturing of the microencapsulated film of the invention will be described with reference to the accompanying drawings.

In order to produce a microencapsulated film of the invention, it is necessary to have a bath with a liquid containing a surface-active medium along with or without the material to be encapsulated or a container filled with a gaseous medium such as a gaseous surface-active substance and a material to be encapsulated in case the capsules have to be filled with a gaseous medium or vapors of a solid material. In the latter case, it may be, e.g., a vacuum chamber. Another hardware required for the realization of the method of the invention is a stretching machine capable of stretching a film in different directions, e.g., in two mutually-perpendicular directions. Such machines are known and used e.g., for biaxial orientation of polymer films.

Figure 5:
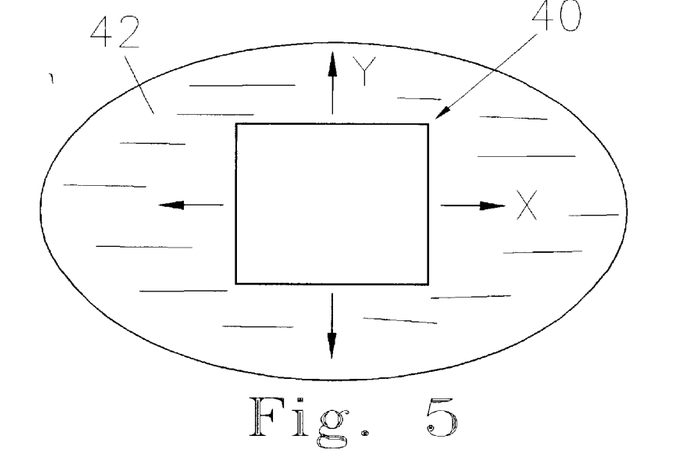
FIG. 5 is a schematic top view of a film stretched in two mutually-perpendicular directions in a bath of a craze-filling medium.

First, the method of the invention will be described in general terms with reference to FIG. 5 and then with greater details describing specific operations and units of equipment used for their accomplishing.

Figure 6:
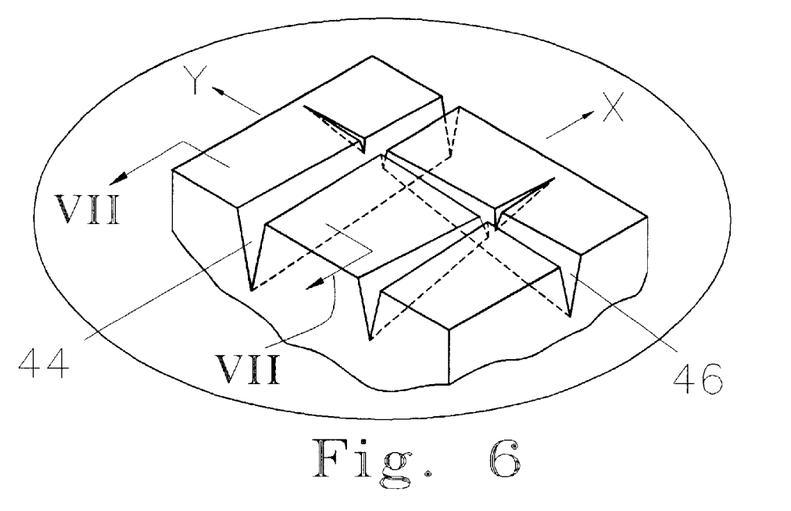
FIG. 6 is a schematic three-dimensional imaginary view of crazes opened when the film is stretched in two intersecting directions.

A polymer film 40 selected for encapsulation of a liquid medium 42 (FIG. 5) is immersed into liquid medium 42 and is stretched in directions X and Y, sequentially or simultaneously. The films is stretched with a controlled rate of stretching to the extent to form crazes 44 and 46 shown in FIG. 6 which is a three-dimensional schematic view of a film with mutually intersecting crazes opened becasue of stretching in two intersecting direcions.

Figure 7:
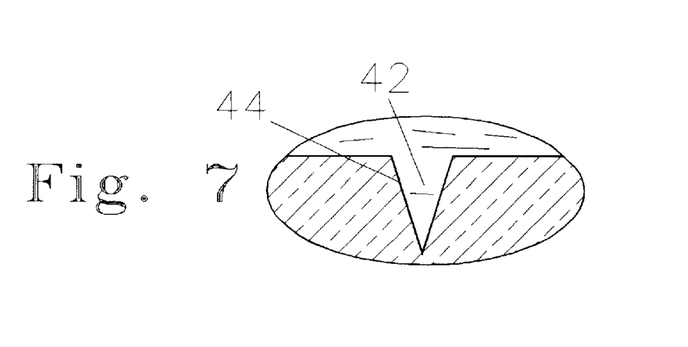
FIG. 7 is a schematic sectional view along line VII—VII of FIG. 6 showing an open crazed filled with the filling medium.

A schematic cross-sectional view of one of the crazes in an open state along line VII—VII is shown in FIG. 7. A craze 44 is filled with medium 42. When stretching is discontinued, crazes are closed either completely (as shown in FIG. 2) or partially (as shown in FIG. 3A). The film is removed from the medium, and a product of the type shown in FIG. 1 is obtained.

A more specific example of a system suitable for the realization of the method of the invention will now be described with reference to FIG. 8. The process of the manufacturing of a multidirectionally stretch-crazed microencapsulated polymer film may be carried out with the use of a conventional apparatus for manufacturing of films with the structure oriented by stretching in two directions. The apparatus comprises a feed roll 50 from which a polymer film 52 in the form of a feed coil 52a is guided through a first pair of longitudinally stretching rollers 54a and 54b, a set of transversely stretching rollers 56a and 56b, a second pair of longitudinally stretching rollers 58a and 58b, and a receiving roller 64 that receives the treated encapsulated film in the form of a coil 64a. On its way from roll 50 to rolls 54a and 54b the film passes through a bath 60 filled with a medium consisting of a surface-active substance along with or without the material to be encapsulated and through a dryer 62 located between bath 60 and receiving roll 64.

Longitudinal direction of film 52 is designated by arrow L and transverse direction of film 52 is designated by arrows T. Longitudinally-stretching rollers 54a, 54b rotate with a speed lower than the speed of rotation of longitudinally stretching rollers 58a, 58b. Stretching in the transverse direction T is achieved due to the fact that rollers 56a and 56b are arranged at an angle different from 90° to direction L, so that each pair of rollers 56a and 56b acts on film 52 with a force that can be decomposed into a longitudinal component $F_L$ and a transverse component $F_T$. The latter contributes to the transverse stretching of film 52.

When film is in a stretched state, i.e., is between first longitudinally-stretching rollers 54a, 54b, set of transversely-stretching rollers 56a, 56b, and second longitudinally-stretching rollers 58a and 58b, crazes such as crazes 44 and 46 are opened and filled with medium, e.g., medium 42. When film 52 leaves second longitudinally-stretching rollers 58a and 58b it starts to relax so that opened crazes begin to close. The closing of the crazes to the state shown in FIG. 2 is completed in dryer 62.

In the process of manufacturing of the stretch-crazed encapsulated film 66, the amount of the encapsulated material and the degree of stretching of the film may be controlled by adjusting speeds of rotation of rollers 54a, 54b, 58a, 58b, and 56a, 56b. The amount of the material encapsulated in the film may be measured, e.g., by measuring an optical density of the encapsulated film 66.

Figure 8:
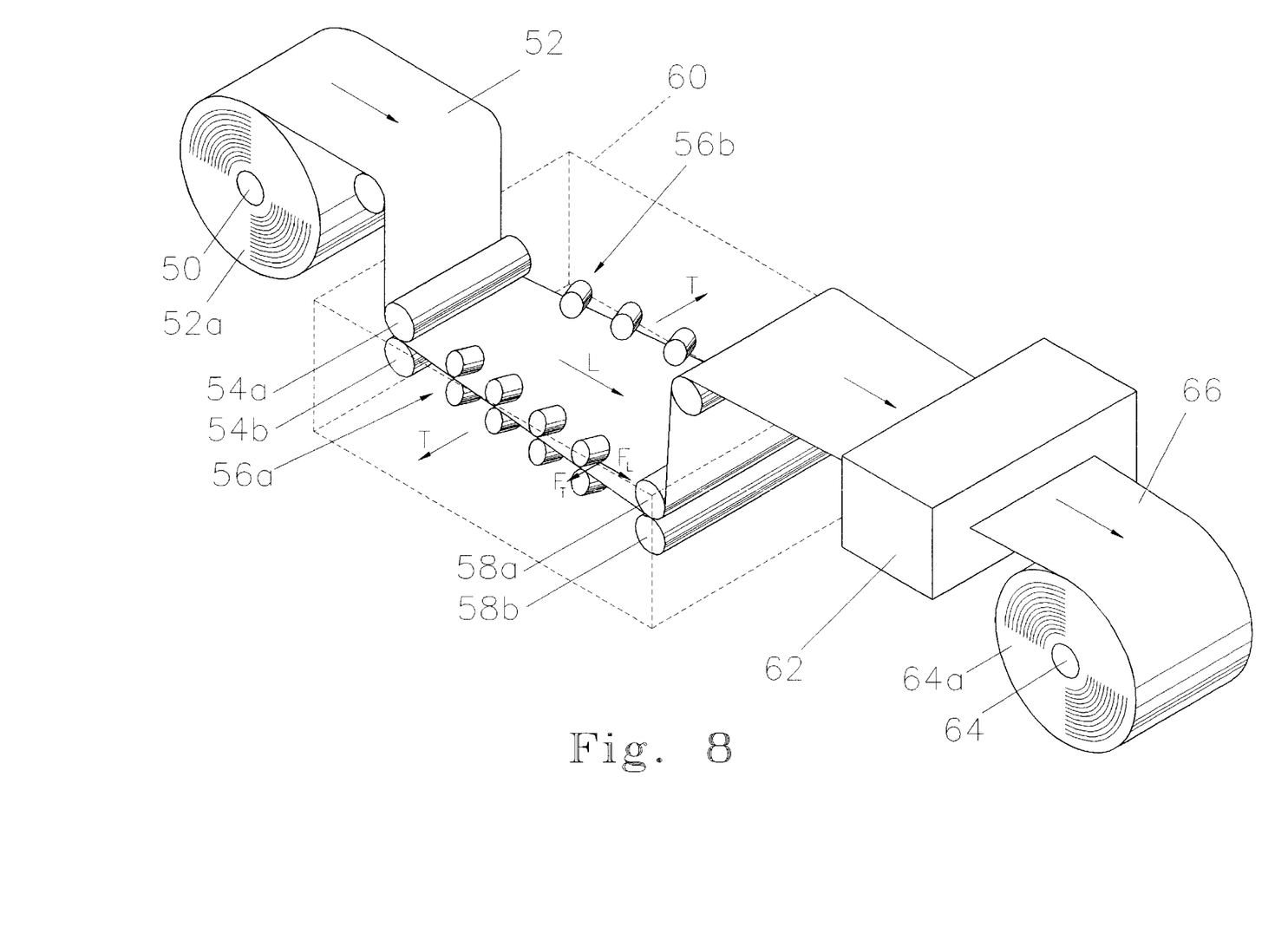
FIG. 8 is a schematic three-dimensional view of an apparatus for carrying out the method of the present invention with stretching in a liquid environment.
Figure 9:
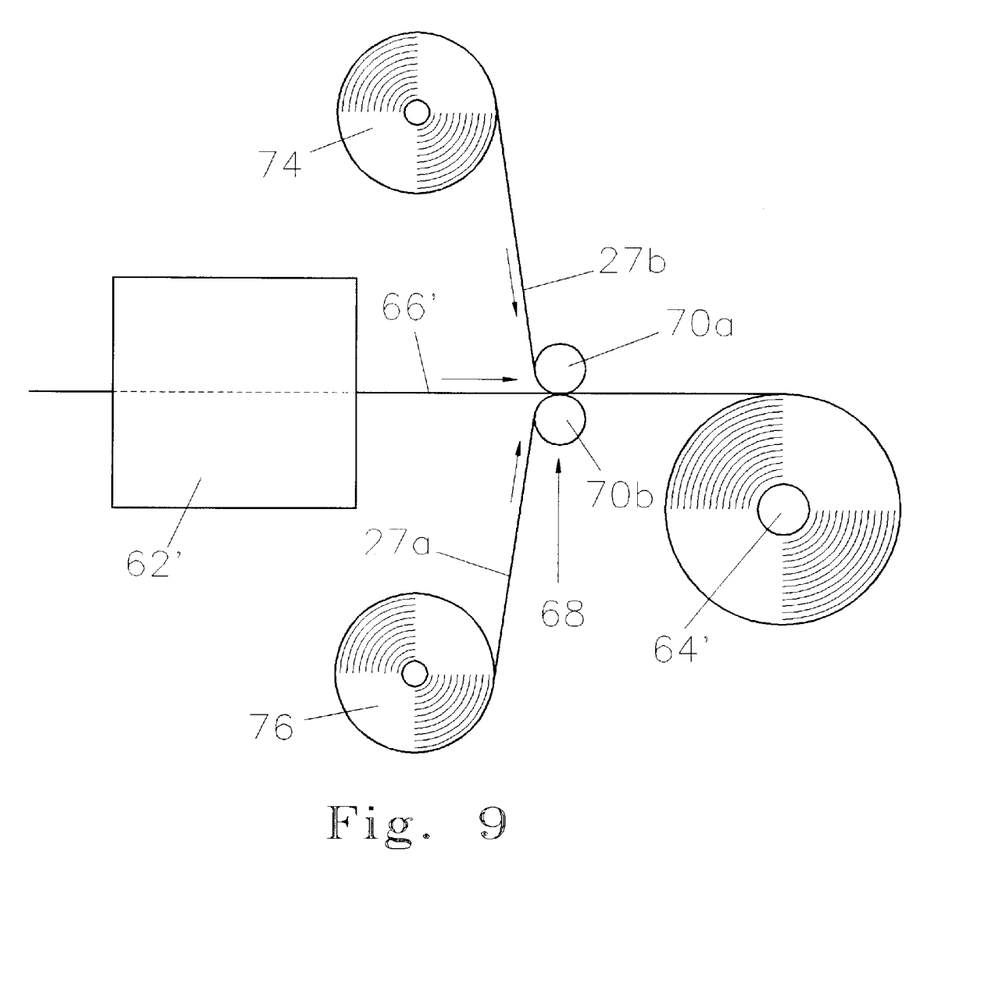
FIG. 9 is a partial schematic view of an apparatus for manufacturing a film of the invention with microcapsules of the type shown in FIGS. 3A and 3B.

In order to manufacture the stretch-crazed film with capillarilly-open capsules 26 of the type shown in FIG. 3A, the apparatus of FIG. 8 may be modified into a system a part of which is shown in FIG. 9. In this system (where parts and units identical to those of the apparatus of FIG. 8 are designated by the same reference numerals but with the addition of a prime), an additional unit for feeding and attaching capsule-relaxation restricting means 27a and 27b are placed between dryer 62' and receiving roll 64'. Means 27a and 27b may be, e.g., in the form of net-like belts of a material with the modulus of elasticity higher than that of film 66'. It can be, e.g., fiber net or a net of the same material as the film but with an oriented structure. The aforementioned additional unit may comprise an upper coil 74 of net-like material 27b and a lower coil 76 of net-like material 27a. After application on film 66', the multilayer belt formed by film 66' and net-like materials 27a and 27b is passed between a joining unit 68. This unit may consist of heating pressure rollers 70a and 70b or any other suitable means. It is understood that during covering with the closure-restricting substance the film should remain in a stretched state.

The film of the type shown in FIG. 3b may be obtained if materials 27a and 27b are peelable adhesive tapes.

Figure 8A:
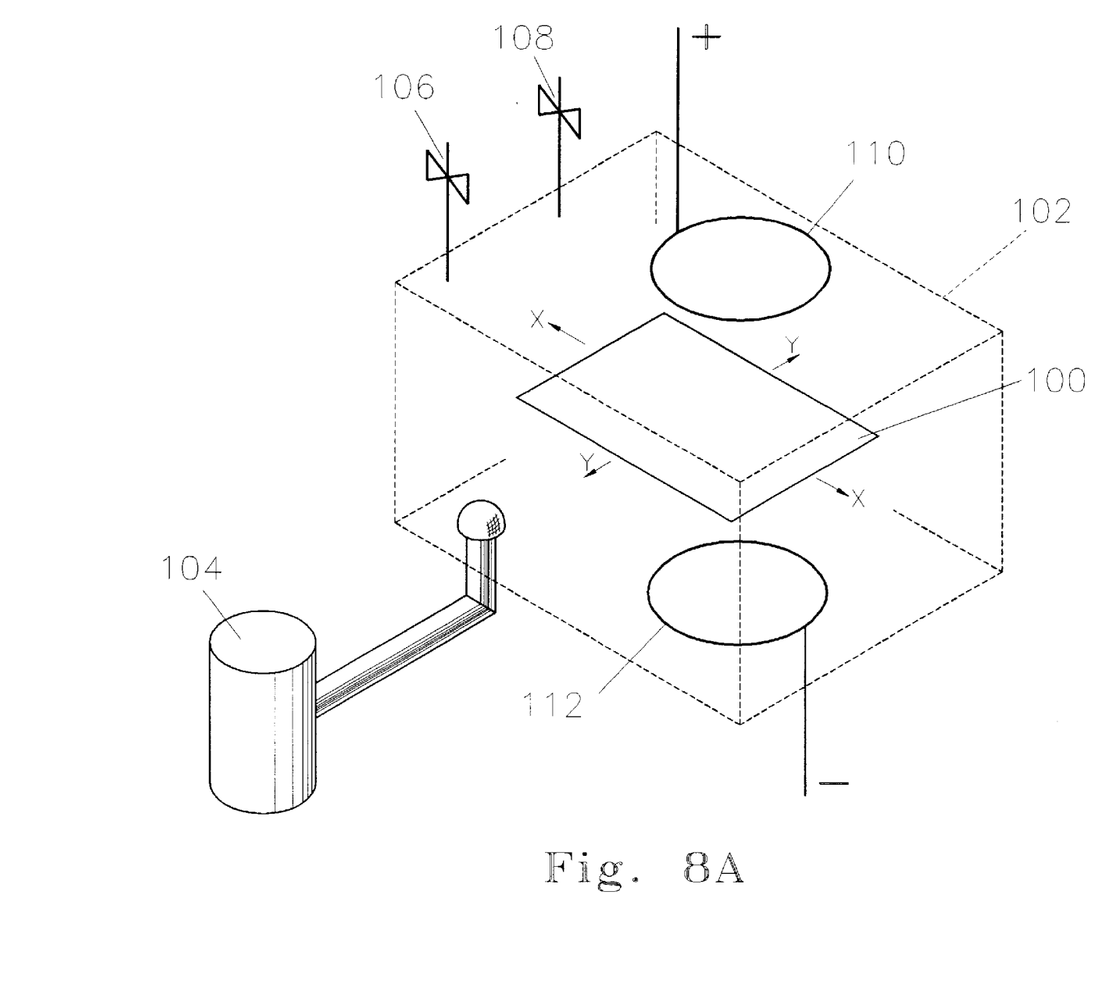
FIG. 8A is a schematic view of an apparatus for carrying out the method of the invention with stretching in a gaseous environment in a vacuum chamber.

FIG. 8A illustrates an apparatus for microencapsulation of a film 100 with a gaseous medium, e.g., nitrogen. The apparatus comprises a vacuum chamber 102 having a vacuum source 104 for inducing a reduced pressure inside chamber 102. The chamber is connected to a source of a gaseous surface-active substance, e.g., isobutanol that is supplied via an inlet 106 and a source of a gaseous medium to be encapsulated that is supplied via an inlet 108. Vacuum chamber 102 contains film stretching means which are not shown and depicted by arrows X and Y.

To facilitate the process, vacuum chamber 102 contains a pair of positive circular electrodes 110 and 112 for performing the process of stretch-crazing as a cathode-activated process.

According to this process, film 100 is stretched and crazed in vacuum in chamber 102 with the supply of vapors of isobutanol that functions as an ionized gas which accelerates opening of the crazes. After the crazed have opened, the supply of isobutanol is discontinued, the isobutanol that is contained in chamber 102 is evacuated by vacuum source 104, and a gaseous medium such as nitrogen to be encapsulated is introduced via inlet 108, whereby the opened crazes are filled with nitrogen. Then the stretching is discontinued, and crazes are closed with microencapsulation of nitrogen.

Chamber 102 may be a conventional industrial vacuum chamber equipped with a metal evaporator (not shown) which allows encapsulation of metal vapors with or without the gaseous medium.

The sterile environment of vacuum chambers make them most appropriate for encapsulation of medical substances.

The method of manufacturing microencapsulated films of the present invention will be further described with reference to practical examples which should not be construed as limiting the scope of the invention as claimed in the patent claims given below.

EXAMPLE 1

Polymer films with physical and mechanical properties presented in Table 1 were microencapsulated with the surface-active media having properties shown in Table 2.

TABLE 1

| Material | Melt Index (g/10 min) [ASTM test method D 1238] | Density, g/cm$^3$ [DIN 53479] | Tensile strength at yield in MPa [ASTM D638] | Elongation at yield, %, ASTM D638] |
|---|---|---|---|---|
| Polystyrene | 1.8 | 1.04 | 44.8 | 3 |
| Polycarbinate | — | 1.2 | 58.6 | 6 |
| Polyvinyl chloride (plasticized) | — | 1.28 | 51.7 | 3 to 100 |

TABLE 2

| Surface-active media | Density at 20° C., g/cm$^3$ |
|---|---|
| Isopropyl alcohol (CH$_3$)$_2$CHOH | 0.7851 |
| Ethyl alcohol C$_2$H$_5$OH | 0.7893 |

The films had thickness within the range of 100 to 300 μm and a width within the range 300 to 500 mm. Microencapsulation was carried out with the use of an apparatus of the type shown in FIG. 8 with two-axial stretching at a rate of 1 to 5×10$^{-2}$ min$^{-1}$.

The weight of surface-active media encapsulated within the material of the film was determined by weighing prior to and after microencapsulation. Identification of the surface-active media within the films was performed by infrared (IR) spectral analysis of the films prior to and after microencapsulation. Weighing and IR analysis were conducted 30 min after removal of the films from the bath with subsequent drying in a free state. This time was sufficient for complete evaporation of the surface-active media from the sufaces of similar films which were immersed into the same bath but without stretching (a control group).

Apart from absorption bands of the initial polymer material, the spectral characteristics of the samples of stretched and encapsulated films also showed absorption bands of the surface-active media. The intensity of the last-mentioned bands depended on the quantity of the encapsulated media. The most noticeable change in the nature of the spectra with variations in the valency of hydroxyl groups occurred within the range of 3300 to 3700 cm$^{-1}$. Changes in the nature of the spectra were revealed also in the range of 900 to 1400 cm$^{-1}$.

Weights of the surface-active substances encapsulated in the films at various deformation conditions are shown in Table 3. The volumes of the surface-active substances shown in this table were the volumes occupied by the surface-active substances in 1 cm$^3$ of the film of each type. Calculations were carried out based on the condition that at 20° C. the isopropyl alcohol (CH$_3$)$_2$CHOH has a density equal to 0.78 g/cm$^3$.

The data presented in Table 3 is not essentially changed when stretched in other alcohols at stretching rates of 1 to 5×10$^{-2}$/min.

TABLE 3

| Film material | Deformation of the film in the direction of extrusion, % | Deformation of the film in the transverse direction, % | Weight ratio (%) of encapsulated media to film | Volume (cm$^3$) of the encapsulated media in 1 cm$^3$ of the film |
|---|---|---|---|---|
| Polystyrene | 20 | 3 | 20 | 0.26 |
| Polycarbonate | 16 | 5 | 18 | 0.27 |
| Polyvinyl chloride (plasticized) | 22 | 6 | 17 | 0.27 |

In the course of drying, the surface-active media (alcohols) entrapped within the film left the film due to evaporation via incompletely closed crazes. This process was controlled by weighing and by means of IR spectral analysis. When, however, the weight of the entrapped alcohol was reduced to 3040% (as compared to the initially-weighed entrapped amount) the crazes were closed and the process of evaporation transformed into a diffusion process. This diffusion process can be expressed, e.g., for polyvinyl chloride, by the following empirical formula:

$$D = 8.2 \times 10^{-1} exp{-9800/RT},$$

where R is a constant equal to 1.987 cal/mole·°K and T is a temperature in °K. This formula is valid for a temperature interval 10 to 6° C.

The same formula describes the process of diffusion of the aformentioned medium through the polyvinyl chloride film prior to stretch-craze encapsulation. This means that the closed-crazed structure of the film is practically indistinguishable from the original, unstretched and non-capsulated polyvinyl chloride film. The same results but with other empirical relationships were obtained in experiments with other films and media. In other words, if after the drying the volume of any microencapsulated liquid in the film is within the range of 30 to 40%, the crazes are closed.

EXAMPLE 2

This experiment was carried out with microencapsulation of solids given in Table 4.

TABLE 4

| Description | Basic component | Crystalline lattice (shape of particles) | Density, g/cm$^3$ | Particle size, $\mu$m |
|---|---|---|---|---|
| Carbon black | Carbon | polyhedral (spherical) | 2.07 to 2.20 | 0.015 to 0.030 |
| Pigment (green or blue) | Cr$_2$O$_3$.nH$_2$O | — | 4.8 to 5.0 | 3 to 10 |

The process of microencapsulation was carried out under the same conditions as in Example 1 but with the introduction into the surface-active substance of solids given in Table 4. The concentration of the solids in the surface-active substances was within the range of 1 to $10^{-1}$%.

The results of the tests conducted in this examples showed that the presence of the solids in the surface-active substances did not change the kinetics of the aforementioned processes of evaporation and diffusion. However, after the liquid left the film, the solids remained microencapsulated within the closed crazes whereby the films became practically impermeable to visible light.

All the samples were subjected to bending tests. The results of the tests showed that microencapsulation did not impair physical properties of the initial film and that the samples withstood 1000 double bends inherent in the initial film.

EXAMPLE 3

The tests were conducted under the same conditions as in Example 1 with the exception that the stretch-crazing was conducted in a different environment which had the following composition:

Isopropylene alcohol 40%
Epoxy resin (molecular weight 400) 40%
Toluene 14%
Hardener 6%

After encapsulation was completed, the samples were dried 5 to 7 hours at room temperature. The film became quite rigid, with a modulus of elasticity of approximately 2500 MPa resembling that of "traditionally" reinforced polymer film (i.e., by films prepared by mixing reinforcing fibers into the composition of the film). The reinforcement structure was in a net-like form with closed cells and with crazes containing the hardened epoxy resin. Such a reinforcement structure was obtained without the use of traditional additional steps of preparing the reinforcement fibers, cutting them to a required length, melting the resin, mixing the melt with the fibers, and forming the mixture into the film.

The main advantage of the film reinforced by microencapsulation was that it had an equal modulus of elasticity in all mutually perpendicular directions.

In other words, the microencapsulation by the principle of the invention improved physical and mechanical characteristics of the initial films.

SUMMARY, RAMIFICATIONS, AND SCOPE

Thus it has been shown that the invention provides multidirectionally stretch-crazed microencapsulated polymer films which are inexpensive to manufacture, contain microcapsules inside the material of the film, contain microcapsules that form a closed net-like structure inside the film material, involve only a few technological manufacturing steps, is produced with a simplified control of the distribution and density of the microcapsules, may contain microcapsules as small as several tens of Angstrems, may contain in capsules a wide range of solid, liquid, and gaseous substances or their mixtures, is free of by-products of chemical reactions inherent in the conventional methods of encapsulation, and can be used with higher efficiency of encapsulation.

It has also been shown that the invention provides a method for manufacturing the aforementioned microencapsulated films which is simple and inexpensive, not substance-dependent, is performed without any losses of the substance to be encapsulated, produced without a step of preliminary manufacturing of capsules, without a step of attaching the capsules to the surface of the film and thus is free of all disadvantages inherent in the steps of conventional encapsulation, could be performed at room temperature, is free of chemical reactions normally required for conventional encapsulation, and can utilize the cavity-formation potential of the film to a greater extent.

Further invention provides a film strengthened by microencapsulation.

Although the description given contains many specificities, these should not be construed as limiting the scope of the invention but as merely providing illustrations of some of the presently preferred embodiments of this invention. For example, the films were stretched once in one direction and once in the direction perpendicular to the first one. However, the stretching may be carried out in a two or more stretching-relaxation cycles. The microencapsulation may be performed in an apparatus different from that shown in FIG. 8. For example, the film may be supplied in the form of sheets rather than from the coils. The films may be supplied to the bath from several coil and processed in parallel and simultaneously. The product was shown in the form of a film but the principle of the invention may be equally applicable to fibers or capillary tubes. Substances other than those surface-active media, polymers of films, and encapsulated materials described above can be used. For example, the film may be of any other thermoplastic material. The encapsulation may be carried at low temperatures, provided the film has a low glass-transition point. The films may be stretched in directions intersecting at an angle different from 90° and/or stretched in more than two directions. The film may be overlaid by a mask film having a predetermined pattern of masking so that the masked areas will be free of crazes. This principle may be used for applying signs, characters, figures, etc. The film may be in the form of a closed loop and pass through the bath several times, or the apparatus of FIG. 8 may be built into a continuous technological process as one of the steps with preceding and subsequent treatment of the film. The bath can be replaced, e.g., by rolls between which the film is passed with one of the rolls being immersed into the medium to be encapsulated.

Therefore any other modifications and variations are possible, provided they are within the scope of the claims of the present invention.

We claim:

1. A multidirectionally stretch-crazed microencapsulated polymer film, comprising a matrix material, microcapsules which are formed in said matrix material in the form of crazes which are filled with a microencapsulated substance and oriented at least in two mutually intersecting directions, and means for restricting complete closing of said crazes, said crazes forming a net-shaped structure.

2. The microencapsulated film of claim 1, wherein said microencapsulated substance is selected from a group of the liquid, a gas, solid substance and mixtures thereof.

3. The microencapsulated film of claim 2, wherein said means for restricting complete closing of said crazes covers at least a part of a surface of said film and is attached to said surface when said crazes are opened, said means for restricting complete closing of said crazes having a modulus of elasticity higher than that of said matrix material.

4. The microencapsulated film of claim 3, wherein said means for restricting complete closing of said crazes is permeable to said microencapsulated substance.

5. The microencapsulated film of claim 4, wherein said means for restricting complete closing of said crazes is a film composed of said matrix material with an oriented structure.

6. The microencapsulated film of claim 5, wherein said matrix material is a material selected from a group consisting of polystyrene, polycarbonate, polyethylene terephthalate, nylon, poly p-methylstyrene, poly t-butyl styrene, poly-2-methylpropene, flexible polyvinyl chloride, polymethylmetacrylate, styrene acrylonitrile copolymers, styrene butadiene copolymers, styrene acrylic acid copolymers, styrene isoprene block copolymers, styrene butadiene block copolymers, polysulfones, polyester sulfones, and blends of polystyrene and poly 2,6-dimethylphenylene oxide.

7. The microencapsulated film of claim 5, wherein said matrix material is a material selected from a group consisting of polystyrene, polycarbonate, polyethylene terephthalate, nylon, poly p-methylstyrene, poly t-butyl styrene, poly-2-methylpropene, flexible polyvinyl chloride, polymethylmetacrylate, styrene acrylonitrile copolymers, styrene butadiene copolymers, styrene acrylic acid copolymers, styrene isoprene block copolymers, styrene butadiene block copolymers, polysulfones, polyester sulfones, blends of polystyrene and poly 2,6-dimethylphenylene oxide.

8. A multidirectionally stretched-crazed microencapsulated polymer film with a reinforcement where said reinforcement is formed by a net-shaped structure of intersecting crazes filled with a microencapsulated substance, said substance being an epoxy resin.

\* \* \* \* \*